US010604143B2

(12) United States Patent
Naidu et al.

(10) Patent No.: US 10,604,143 B2
(45) Date of Patent: Mar. 31, 2020

(54) ENGINE ASSEMBLY (71) Applicant: Ford Global Technologies, LLC, Dearborn, MI (US)

(72) Inventors: Paspuleti Ashish Kumar Naidu, Dearborn, MI (US); Peter George Brittle, Romford (GB); Brian G. Rutter, Winchmore Hill (GB)

(73) Assignee: Ford Global Technologies, LLC, Dearborn, MI (US)

( * ) Notice: Subject to any disclaimer, the term of this patent is extended or adjusted under 35 U.S.C. 154(b) by 389 days.

(21) Appl. No.: 15/806,034

(22) Filed: Nov. 7, 2017

(65) Prior Publication Data
US 2018/0141536 A1 May 24, 2018

(30) Foreign Application Priority Data
Nov. 23, 2016 (GB) .................................. 1619819.4

(51) Int. Cl.
*B60W 20/10* (2016.01)
*F02D 17/02* (2006.01)
(Continued)

(52) U.S. Cl.
CPC ............... *B60W 20/10* (2013.01); *B60K 6/00* (2013.01); *B60K 6/24* (2013.01); *B60K 6/387* (2013.01); *B60K 6/42* (2013.01); *B60W 10/04* (2013.01); *B60W 10/06* (2013.01); *B60W 10/08* (2013.01); *B60W 20/00* (2013.01); *B60W 20/20* (2013.01); *B60W 20/40* (2013.01); *B60W 30/20* (2013.01); *F02D 17/02* (2013.01); *F02D 41/0087* (2013.01); *F16F 15/264* (2013.01); *B60W 2030/206* (2013.01); *B60Y 2200/92* (2013.01);
(Continued)

(58) Field of Classification Search
None
See application file for complete search history.

(56) References Cited

U.S. PATENT DOCUMENTS 5,823,280 A    10/1998   Lateur et al.
6,658,852 B2 *   12/2003   Frey .......................... B60K 6/48
                                                                                           60/716
(Continued)

FOREIGN PATENT DOCUMENTS

DE             3642487 A1      7/1987
DE      102013210075 A1    12/2013
(Continued)

OTHER PUBLICATIONS

Intellectual Property Office of the United Kingdom, Combined Search and Examination Report Issued in Application No. GB1619819.4, dated Apr. 27, 2017, South Wales, 6 pages.
(Continued)

*Primary Examiner* — Dirk Wright
(74) *Attorney, Agent, or Firm* — Geoffrey Brumbaugh; McCoy Russell LLP (57) ABSTRACT

An internal combustion engine assembly for a motor vehicle is provided. The engine assembly comprising: an engine; an electric motor; and a balance shaft comprising an eccentric mass, wherein the electric motor is configured to selectively rotate the balance shaft in order to balance a vibration characteristic of the engine. A method of operating the engine assembly is also provided.

20 Claims, 5 Drawing Sheets

(51) Int. Cl.
*B60W 20/00* (2016.01)
*B60K 6/00* (2006.01)
*F16F 15/26* (2006.01)
*B60W 10/08* (2006.01)
*B60W 30/20* (2006.01)
*B60K 6/42* (2007.10)
*B60W 10/04* (2006.01)
*B60W 10/06* (2006.01)
*B60K 6/24* (2007.10)
*B60K 6/387* (2007.10)
*B60W 20/20* (2016.01)
*B60W 20/40* (2016.01)
*F02D 41/00* (2006.01)

(52) U.S. Cl.
CPC ...... *B60Y 2300/182* (2013.01); *Y10S 903/905* (2013.01); *Y10S 903/914* (2013.01)

(56) References Cited

U.S. PATENT DOCUMENTS 8,783,222 B2 * 7/2014 Anton .................. F16F 15/265 123/192.2

| | | |
|---|---|---|
| 2002/0108373 A1 | 8/2002 | Frey |
| 2013/0036996 A1 | 2/2013 | Quiring et al. |
| 2013/0312683 A1 | 11/2013 | Anton et al. |

FOREIGN PATENT DOCUMENTS

| | | |
|---|---|---|
| EP | 0337040 A1 | 10/1989 |
| FR | 2858034 A1 | 1/2005 |
| FR | 2904076 A1 | 1/2008 |
| JP | S584689 A | 1/1983 |
| JP | S60234146 A | 11/1985 |
| JP | S62184258 A | 8/1987 |
| JP | S63101539 A | 5/1988 |
| JP | H09230943 A | 9/1997 |
| JP | 2004218697 A | 8/2004 |
| JP | 2010260392 A | 11/2010 |
| KR | 20030016677 A | 3/2003 |

OTHER PUBLICATIONS

European Patent Office, Extended European Search Report Issued in Application No. 17199770.3, dated Apr. 20, 2018, Germany, 9 pages.

* cited by examiner

ENGINE ASSEMBLY

CROSS REFERENCE TO RELATED APPLICATION

The present application claims priority to Great Britain Patent Application No. 1619819.4, filed Nov. 23, 2016. The entire contents of the above-referenced application are hereby incorporated by reference in its entirety for all purposes.

FIELD

The present disclosure relates to an engine assembly for a motor vehicle and is particularly, although not exclusively, concerned with an engine assembly configured to improve fuel consumption of the motor vehicle.

BACKGROUND/SUMMARY

Internal combustion engines for vehicles, such as motor vehicles, are available in many different configurations, which may include different numbers and arrangements of cylinders, the cylinders having different ignition timings and/or ignition orders. Some engine configurations may lead to inherent imbalances in the forces exerted on the crank shaft of the engine during engine running. This can lead to reciprocating, rocking, or torsional vibrations of the crank shaft and/or engine.

Depending on the configuration of the engine, the vibrations may be first order, second order or higher order vibrations relative to the rotation of the engine crank shaft. Again, depending on the configuration of the engine, the severity of the vibrations may vary according to the running speed of the engine.

Many engines incorporate one or more balance shafts, comprising out-of-balance weights, which are driven by the engine to balance vibrations. The balance shafts are typically provided within a housing of the engine and may be adequately supported and lubricated by the engine. The balance shafts may be mechanically coupled to the engine crank shaft via a gear or chain drive such that they may be driven synchronously with the crank shaft of the engine.

In order to reduce the fuel consumption of a motor vehicle, the motor vehicle may be provided with a variable displacement engine, which is capable of deactivating one or more cylinders of the engine when the torque being delivered by the engine or the running speed of the engine is below a threshold value. For example, for an engine assembly comprising four cylinders, it may be desirable to deactivate two of the cylinders when the engine is running at or below a threshold running speed in order to improve the fuel consumption of the vehicle.

Deactivating one or more cylinders of the engine affects the balance in the forces being exerted on the crank shaft during operation of the engine assembly, which may affect the order and/or mode of vibrations of the crank shaft and/or engine and as a result the vibrations may not be balanced.

In one example, the issues described above may be addressed by an internal combustion engine assembly for a motor vehicle comprising an engine, an electric motor wherein the motor vehicle is a hybrid vehicle and wherein the electric motor forms part of a hybrid drive system of the vehicle, and a balance shaft comprising an eccentric mass, wherein the electric motor is configured to selectively rotate the balance shaft in order to balance a vibration characteristic of the engine.

The balance shaft may be provided on the engine. For example, the balance shaft may be provided within a housing of the engine and may be supported, e.g. rotatably supported, by the housing. Alternatively, the balance shaft may be coupled to the engine, e.g. to the engine housing. The balance shaft may be elongate and may extend in a direction parallel to a longitudinal axis of the engine. The balance shaft may comprise a plurality of eccentric masses arranged along the length of the balance shaft, e.g. at or towards each end of the balance shaft. In other arrangements, the balance shaft may consist of the eccentric mass.

The electric motor may be configured to selectively provide power to an engine crank shaft or transmission of the motor vehicle, e.g. to supplement power from the internal combustion engine.

The engine may be a variable displacement engine, e.g. configured to selectively deactivate one or more cylinders of the engine. The vibration characteristic of the engine may vary according to the displacement of the engine.

The engine assembly may be configured to control the rotation of the balance shaft according to the displacement of the engine. The rotational speed and/or direction of the electric motor may be variable such that the speed and/or direction of rotation of the balance shaft may be varied.

The engine assembly may further comprise a variable speed transmission operatively disposed between the electric motor and the balance shaft. The variable speed transmission may be configured such that the speed and/or direction of rotation of the balance shaft may be varied, e.g. relative to a crank shaft of the engine. For example, in order to balance a different mode or order of vibration of the engine.

The balance shaft may be rotated at the same speed as the crank shaft or at twice the speed of the crank shaft. Alternatively, the balance shaft may be driven at half the speed of the crank shaft. Alternatively again, the balance shaft may be driven at any other fraction or multiple of the rotational speed of the crank shaft.

The speed and/or direction in which the balance shaft is rotated may be varied according to the displacement of the engine. The rotational speed and/or direction of the balance shaft may be varied according to the number of cylinders of the engine that are active.

The rotation of the balance shaft may be controlled in order to maintain a predetermined difference in phase angle between the balance shaft and a crank shaft of the engine. When the rotational speed of the balance shaft is not equal to the rotational speed of the crank shaft, rotation of the balance shaft may be controlled such that the difference in phase angle between the balance shaft and the crank shaft is equal to the predetermined difference each time the phase angle of the crank shaft is equal to 0 degrees, or another predetermined phase angle.

The assembly may further comprise a controller comprising one or more modules configured to control the operation of the engine, the electric motor, and/or the variable speed transmission.

The assembly may further comprise a further balance shaft comprising a further eccentric mass. The electric motor may be configured to selectively rotate the further balance shaft relative to the engine in order to balance the vibration characteristic of the engine, e.g. according to a vibration characteristic of the engine to be balanced.

The engine assembly may further comprise a further variable speed transmission operatively disposed between the electric motor and the further balance shaft. The further variable speed transmission may be configured such that the speed and/or direction of rotation of the further balance shaft may be varied.

The assembly may be configured to maintain a predetermined difference in phase angle between the balance shaft and the further balance shaft. The balance shaft and further balance shaft may be coupled, e.g. mechanically coupled. For example, the balance shaft and further balance shaft may be coupled by a gear or chain drive. Alternatively, the electric motor, variable speed transmission, and/or further variable speed transmission may be configured to maintain the predetermined difference in phase angle between the balance shaft and the further balance shaft.

The assembly may further comprise a coupling configured to selectively couple the electric motor to the balance shaft. For example, according to a running speed or displacement of the engine, e.g. according to the vibration characteristic of the engine to be balanced.

The assembly may further comprise a further coupling configured to selectively couple the electric motor to a crank shaft or transmission of the motor vehicle, e.g. in order to supplement the power provided by the engine.

The electric motor may be configured to receive power from the engine and/or a brake system of the vehicle and charge a battery of the vehicle. This may be known by those skilled in the art as regenerative braking.

The assembly may be configured such that rotation of the balance shaft is driven by the engine when the electric motor is charging the battery. For example, the balance shaft may be couplable to the crank shaft of the engine such that rotation of the balance shaft may be driven by the engine. Alternatively, the variable speed transmission, further variable speed transmission, and/or an additional transmission may be configured to selectively transmit power mechanically from the engine or transmission to rotate the balance shaft.

According to another aspect of the present disclosure, there is provided a method of operating an internal combustion engine assembly for a motor vehicle, wherein the engine assembly comprises an engine, an electric motor wherein the motor vehicle is a hybrid vehicle and wherein the electric motor forms part of a hybrid drive system of the vehicle, and a balance shaft comprising an eccentric mass, wherein the method comprises rotating the balance shaft using the electric motor in order to balance a vibration characteristic of the engine.

The method may further comprise selectively providing power to the hybrid drive system using the electric motor, e.g. supplementing the power from the internal combustion engine.

The electric motor may be a motor-generator provided within a hybrid drive system of the vehicle. The method may further comprise: receiving power from the engine or a brake system of the vehicle using the electric motor; and charging a battery of the hybrid vehicle using the electric motor.

The method may further comprise driving the rotation of the balance shaft using the engine whilst the battery is being charged. For example, the balance shaft may be coupled, e.g. mechanically coupled, to the crank shaft of the engine whist the electric motor is acting as a generator to charge the battery.

The method may further comprise: selectively using the electric motor to rotate the balance shaft when the electric motor is not providing power to the hybrid drive system.

The engine may comprise a variable displacement engine. The method may further comprise: varying the displacement of the engine, e.g. by deactivating one or more cylinders of the engine; and controlling the speed and/or direction of rotation of the balance shaft in order to balance the vibration characteristic of the engine.

For example, the engine assembly may comprise a variable speed transmission operatively disposed between the electric motor and the balance shaft. The variable speed transmission may be configured such that the speed and/or direction of rotation of the balance shaft may be varied relative to a crank shaft of the engine. The operation of the variable speed transmission may be adjusted in order to control the speed and/or direction of rotation of the balance shaft. For example, the direction in which the balance shaft is rotated may be reversed when one or more cylinders of the engine are deactivated or reactivated.

The speed and/or direction of rotation of the balance shaft may be controlled such that a different mode and/or order of vibration of the engine is balanced by the rotation of the balance shaft.

The method may comprise decoupling the electric motor from the balance shaft when the engine running speed is above a threshold running speed, e.g. such that the balance shaft is no longer rotated by the electric motor when the engine running speed is above the threshold running speed.

To avoid unnecessary duplication of effort and repetition of text in the specification, certain features are described in relation to only one or several aspects or embodiments of the disclosure. However, it is to be understood that, where it is technically possible, features described in relation to any aspect or embodiment of the present disclosure may also be used with any other aspect or embodiment of the disclosure.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 1 is to scale, although other relative dimensions may be used.

DETAILED DESCRIPTION

Figure 1:
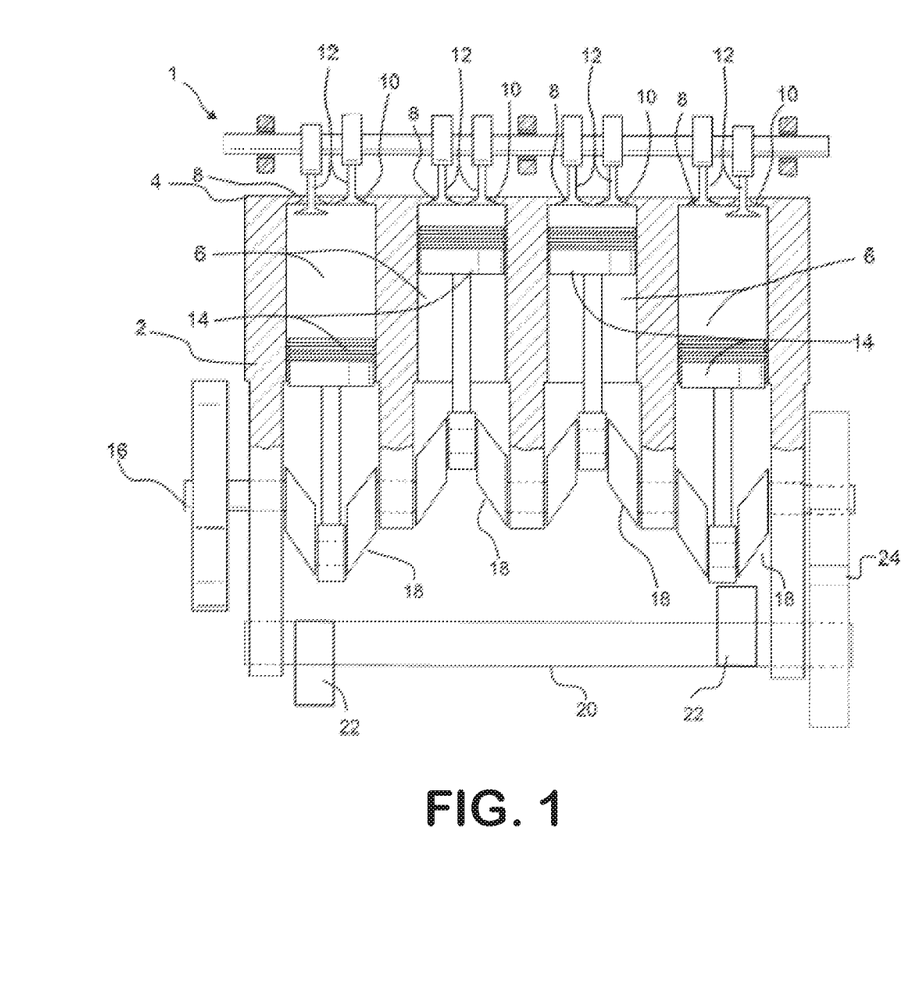
FIG. 1 is a sectional view of a previously proposed internal combustion engine.
Figure 2:
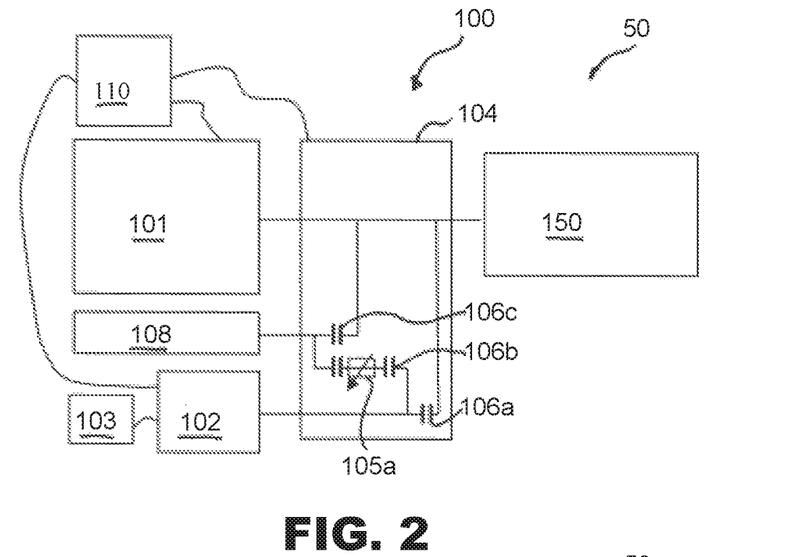
FIG. 2 is a schematic view of a balance assembly according to arrangements of the present disclosure.
Figure 3:
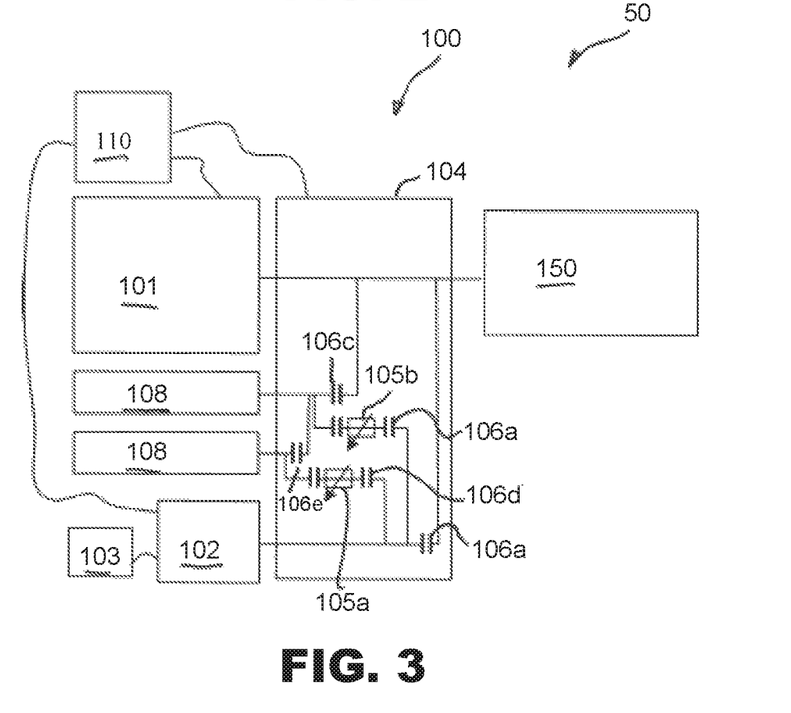
FIG. 3 is a schematic view of a balance assembly according to arrangements of the present disclosure.
Figure 4:
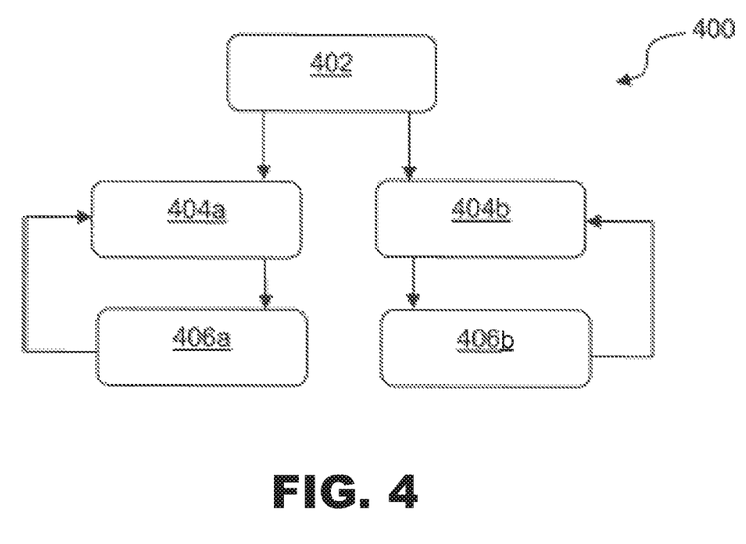
FIG. 4 shows a method of operating an engine assembly according to arrangements of the present disclosure.

The following description relates to systems and methods for a variable displacement engine (VDE). FIGS. 1 to 3 show various views of the VDE. FIG. 4 shows a method for operating the VDE comprising one or more balance shafts.

Figure 5:
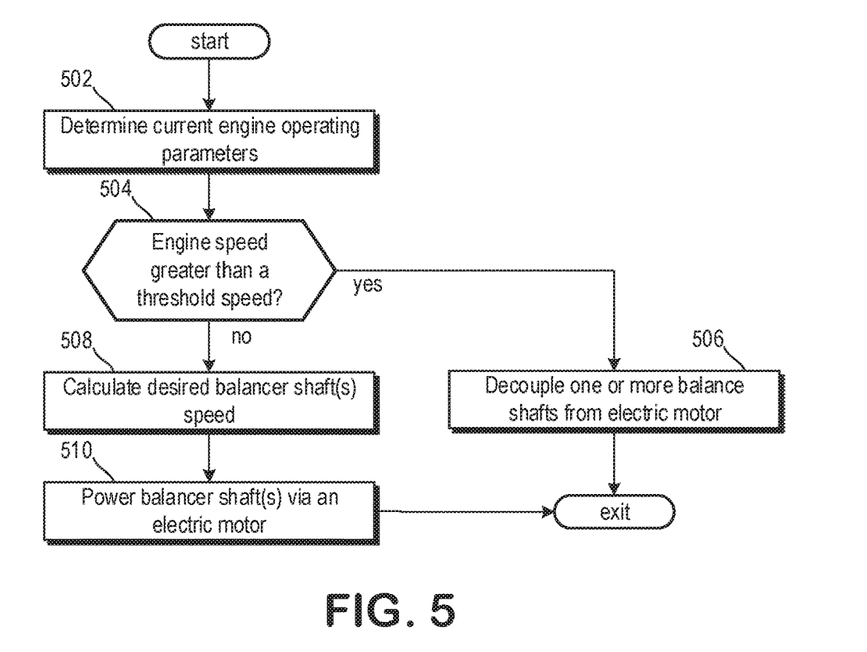
FIG. 5 shows a method for adjusting balance shaft actuation based on engine speed.
Figure 6:
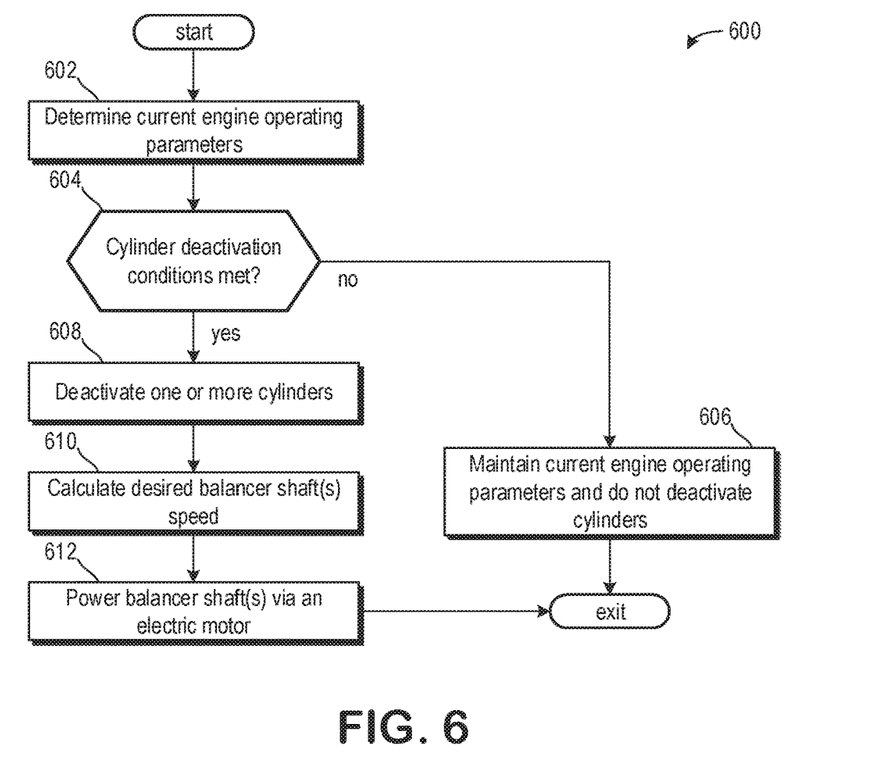
FIG. 6 shows a method for adjusting balance shaft actuation based on cylinder deactivation.
Figure 7:
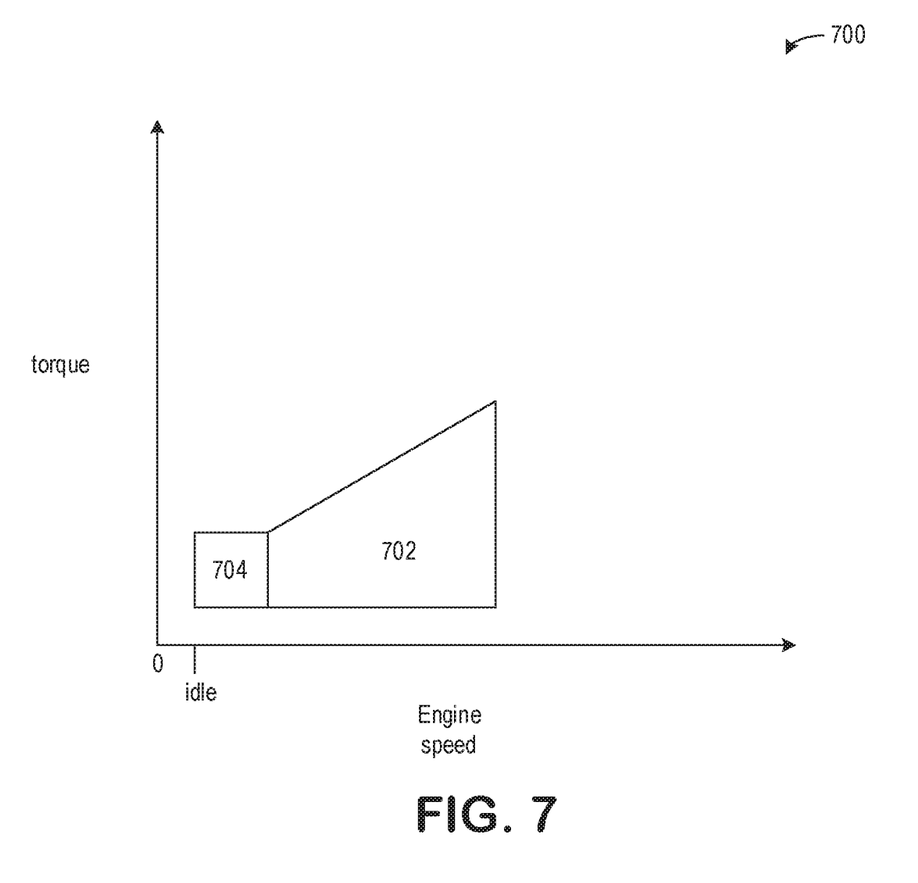
FIG. 7 shows a plot illustrating different areas in which the balance shaft(s) of the present disclosure may assist an engine to reach to achieve a desired fuel economy benefit.

FIG. 5 shows a method for operating the one or more balance shafts in response to an engine speed. FIG. 6 shows a method for operating the one or more balance shafts in response to one or more cylinders being deactivated. FIG. 7 shows a plot illustrating an operating range during cylinder deactivation for a previous example of engine-only actuated balance shafts and the present disclosure example of the one or more balance shafts which may be selectively operated via the electric motor or the engine.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

With reference to FIG. 1, an engine 1, e.g. for a motor vehicle, may comprise one or more engine housings, such as a cylinder block 2 and a cylinder head 4. The cylinder block 2 may define one or more cylinders 6 and the cylinder head may define an inlet port 8 and an exhaust port 10 for each of the cylinders 6. Valves 12 may be provided at each of the inlet and exhaust ports 8, 10 to control the flow of inlet and exhaust gases into and out of the cylinders 6 respectively.

The engine 1 may further comprise a piston 14 provided within each of the cylinders 6. During operation of the engine, movement of the pistons 14 may act to draw inlet air into the cylinders 6. Fuel may be mixed with the inlet air in each of the cylinders. The mixture of fuel and air may then be compressed by the pistons 14 before being combusted to produce expanding combustion gases. The expanding combustion gases act on the pistons 14 to drive the pistons within the cylinder 6 and turn a crankshaft 16 of the engine. The action of the pistons may then force the combustion gases from the cylinders through the exhaust ports 10.

The pistons 14 may be coupled to the crankshaft 16 via crank throws 18, which extend radially from a central axis of the crankshaft, about which the crankshaft 16 rotates. The crank throws 18 may each extend from the crankshaft 16 in substantially the same radial direction as each other. Alternatively, as depicted in FIG. 1, two of the crank throws 18 may be angularly offset from the other crank throws. In alternative arrangements (not shown), each of the crank throws 18 may be angularly offset from each of the others.

Arranging the crank throws 18 to extend from the crankshaft 16 at different angles results in the combustion of fuel and air within the cylinders driving the pistons 14 at different points during the rotation of the crankshaft 16. The angles of the crank throws 18 may be adjusted to alter the timings of the combustion events. Additionally, as shown in FIG. 1, although two of the pistons 14 are located at a top dead centre position, due to the timing of the opening and closing of the valves 12, and/or the injection of fuel into the cylinders 6, only one of the cylinders 6 may contain a mixture of inlet air and fuel ready for combustion. The ordering with which the cylinders are fired can therefore be determined by adjusting the timings with which the valves 12 are opened and closed, and/or the fuel is injected.

In addition to the forces caused by the combustion of fuel within the cylinders 6, as the pistons 14 reciprocate, forces are applied to the crankshaft 16 due to the inertias of the pistons 14. The force exerted due to each piston may be out of balance with forces acting on the crankshaft due to the other pistons. The forces may therefore produce vibrations of the crankshaft 16, such as reciprocating, oscillating, rocking, and/or torsional vibrations.

The mode and/or magnitude of the vibrations may depend on the number and/or arrangement of the pistons 14 provided in the engine 1. Additionally, the relative timings of the movements of the pistons 14 and/or the order in which the cylinders 6 are fired may affect the vibration induced in the crankshaft 16.

The vibrations induced in the crankshaft 16 may be at substantially the same frequency as the engine running speed, e.g. they may be first order vibrations. Alternatively, the vibrations induced in the crankshaft 16 may be half, twice or three times the frequency of the crankshaft rotation or any other fraction or multiple thereof. The vibrations of the engine 1 may comprise multiple components at different frequencies relative to the engine running speed. The frequency of vibrations may depend on the number and/or arrangement of the cylinders 6, and/or on the relative timings of the movements of the pistons 14 and/or the order in which the cylinders 6 are fired. For example, in the arrangement shown in FIG. 1, the movement of the pistons 14 may induce a vibration in the crank shaft at a frequency of twice the rotational speed of the crankshaft, e.g. a second order vibration.

The engine 1 comprises a balance shaft 20 having eccentric masses 22. The balance shaft 20 is provided within the engine. For example, in the arrangement shown in FIG. 1, the balance shaft 20 is provided within the cylinder block. The balance shaft 20 is configured to rotate relative to the engine housings 2, 4.

As shown in FIG. 1, the balance shaft 20 may be elongate and may extend in a direction parallel to a longitudinal axis of the engine. The balance shaft may extend substantially along the full length of the engine 1. The eccentric masses 22 may be spaced apart and provided at or near the ends of the balance shaft 20. Said another way, the balance shaft 20 may traverse an entire length of the engine 1 such that its length is greater than a total length of a group of inline cylinders. For example, if cylinders are arranged in an I-4 arrangement, the balance shaft 20 is longer than a total length of the four cylinders. As another example, if cylinders are arranged in a V-6 arrangement, the balance shaft 20 is longer than a total length of three cylinders of the arrangement.

In the arrangement shown in FIG. 1, the balance shaft 20 is mechanically coupled to the crankshaft 16 via a gear drive 24, such that the balance shaft is driven synchronously by the crankshaft 16. The balance shaft 20 may be driven at the same rotational speed as the crankshaft. Alternatively, the balance shaft 20 may be driven at twice the rotational speed of the crankshaft or at half the rotational speed of the crankshaft. Alternatively again, the balance shaft 20 may be driven at any other multiple or fraction of the rotational speed of the crankshaft 16. The eccentric masses 22 of the balance shaft 20 are configured such that as the balance shaft 20 rotates, the accelerations of the eccentric masses 22 generate imbalanced forces in the engine 1 that balance the vibrations of the crankshaft 16 described above.

The engine 1 described above with reference to FIG. 1 is a previously proposed engine. However, the description of each of the features of the engine 1 may apply equally to the engine 101 provided within the hybrid engine assembly 100, according to the present disclosure, described below.

With reference to FIG. 2, a hybrid vehicle 50 comprises a hybrid engine assembly 100 according to arrangements of the present disclosure, and a transmission 150 configured to transmit torque from the hybrid engine assembly 100 to wheels of the vehicle. The hybrid engine assembly comprises an engine 101, an electric motor 102, a drive mechanism 104, and a balance shaft 108.

The balance shaft 108 may be provided within the hybrid engine assembly 100 and may be connected to the engine 101 so as to cancel out vibrations of the engine. The balance shaft 108 may be provided within or adjacent to the engine 101. The balance shaft 108 may be similar to the balance shaft 20 of FIG. 1. Additionally or alternatively, the balance shaft 108 may not be mechanically coupled to the crankshaft, e.g. by a gear or chain drive, and may or may not be driven by the crankshaft of the engine 101. Instead, the balance shaft 108 may be rotated by the electric motor 102 in order to balance vibrations of the engine.

The electric motor 102 may form part of a hybrid drive system for the vehicle. In the arrangement shown in FIG. 2, the hybrid engine assembly 100 is for a mild hybrid vehicle. Accordingly, the electric motor 102 and the drive mechanism 104 are configured such that power may be provided by the electric motor 102 to the crank shaft of the engine 101 in order to turn over and start the engine. Additionally, the electric motor 102 may be configured to provide power in order to supplement the power being provided by the engine.

In other arrangements, the hybrid engine assembly 100 may be for a full hybrid vehicle in which in a particular mode the electric motor 102 is configured to operate in an electric only mode, during which power from the electric motor 102 is used exclusively to drive the vehicle.

The electric motor 102 may be a motor-generator. The electric motor 102 and the drive mechanism 104 may be configured to receive power from the engine 101 and/or the transmission 150, e.g. when the vehicle is coasting or braking. When receiving power from the engine 101 and/or transmission 150, the electric motor 102 may act as a generator and may charge a battery 103 provided on the vehicle. Additionally or alternatively, the electric motor 102 may receive power from a brake system of the hybrid vehicle (not shown) to charge the battery 103 (e.g., regenerative braking).

When the electric motor 102 is operating to supplement the power provided by the engine, the drive mechanism 104 may be configured to receive power from the engine 101 and the electric motor 102, and transfer the power to the transmission 150. Alternatively, when the electric motor 102 is acting as a generator to charge the battery 103 of the vehicle, the drive mechanism 104 may be configured to receive power from the engine 101 and/or the transmission 150 and may provide power to the electric motor 102. Additionally, the drive mechanism 104 may be configured to selectively transfer torque, e.g. from the electric motor 102 and/or the engine 101 to the balance shaft 108 to rotate the balance shaft and balance vibrations of the engine.

With continued reference to FIG. 2, in some arrangements of the present disclosure the drive mechanism 104 may comprise one or more optional Variable Speed Transmissions (VSTs) 105a and one or more couplings or clutches 106a, 106b, 106c. For example, as depicted in FIG. 2, the drive mechanism may comprise a first clutch 106a configured to allow the electric motor 102 to selectively provide power to the transmission 150. The drive mechanism 104 may further comprise a second clutch 106b provided between the electric motor 102 and the balance shaft 108 and configured to allow torque to be selectively transmitted from the electric motor 102 to the balance shaft 108. The VST 105a may be provided between the electric motor 102 and the balance shaft 108 and may be configured to allow the speed and/or direction of rotation of the balance shaft to be selectively varied, e.g. relative to the speed and direction in which the crank shaft and/or a drive shaft of the transmission 150 is rotating.

When the electric motor 102 is acting as a generator and charging a battery 103 of the vehicle, the electric motor 102 may not provide power to the drive mechanism 104 to rotate the balance shaft 108. In this case, it may be desirable for rotation of the balance shaft to be driven by the engine 101. For example, as shown in FIG. 2, the drive mechanism 104 may comprise a third coupling or clutch 106c configured to allow the balance shaft to be selectively coupled, e.g. mechanically coupled, to the engine 101 such that the balance shaft may be driven by the engine 101.

In other arrangements of the present disclosure, the drive mechanism 104 may comprise a different arrangement of couplings and/or variable speed transmissions. For example in some arrangements, the VST 105a, or an additional VST, may be provided between the electric motor 102 and the transmission 150. In another arrangement, the VST 105a may be omitted, for example, the speed of the electric motor 102 may be varied to rotate the balance shaft at the appropriate speed.

The balance shaft 108 may be provided within a housing of the engine 101 in the same way as the balance shaft 20 described above. Alternatively, as depicted in FIG. 2, the balance shaft 108 may be provided outside of the housing of the engine 101. The balance shaft 108 may be coupled to the engine 101, e.g. to a housing of the engine, such that vibrations of the engine may be balanced by the balance shaft 108.

In some arrangements, the balance shaft 108 may be elongate and may extend in a longitudinal direction of the engine 101. The balance shaft 108 may comprise two or more eccentric masses. In other arrangements, the balance shaft 108 may consist of an eccentric mass pivotally supported on the hybrid engine assembly 100.

As described above with reference to FIG. 1, during operation of the engine 100, out of balance forces may be applied to the crankshaft of the engine 101, which may cause vibration of the engine 101. The electric motor 102 may be configured to rotate the balance shaft 108 to balance vibrations of the engine 100.

In order to effectively balance the vibrations of the engine, it may be desirable for the balance shaft 108 to be rotated at the same rotational speed of the crankshaft or a predetermined fraction or multiple of the rotational speed of the crankshaft. During operation of the hybrid engine assembly 50, the rotational speed of the crankshaft may increase and decrease. The engine assembly 50 may comprise a crank position sensor configured to determine the rotational speed of the crankshaft. The rotation of the balance shaft 108 may be controlled accordingly. For example, the rotation of the balance shaft 108 may be controlled by controlling the speed of the electric motor 102. Additionally or alternatively, the rotation of the balance shaft 108 may be varied by controlling the operation of the drive mechanism 104, e.g. of the VST 105a.

In some arrangements of the engine 101 and/or in order to balance particular modes of vibration, it may be desirable for the hybrid engine assembly 100 to comprise a plurality of balance shafts 108. For example, as depicted in FIG. 3, the hybrid engine assembly may comprise two balance shafts.

As depicted in FIG. 3, when the hybrid engine assembly 100 comprises two balance shafts 108, the drive mechanism 104 may comprise a further VST 105b provided between the electric motor 102 and the balance shafts 108. Each of the VSTs 105a, 105b provided within the drive mechanism 104 may be configured to allow the speed and/or direction of rotation of a corresponding balance shaft to be controlled. The drive mechanism 104 may further comprise a fourth clutch or coupling 106d configured to permit the balance shaft to be selectively coupled to the electric motor 102 and be driven by the electric motor.

In some arrangements, the balance shafts 108 may be couplable, e.g. mechanically couplable, to each other. The drive mechanism 104 may comprise a fifth coupling 106e configured to selectively couple the balance shafts 108 to one each other. The balance shafts 108 may be coupled together when it is desirable for the balance shafts 108 to be rotated at the same speed as each other. Additionally, the balance shafts 108 may be coupled together when the electric motor 102 is acting as a generator and rotation of the balance shafts 108 is being driven by the engine 101. In another arrangement, the two balance shafts 108 may be permanently mechanically coupled together, e.g. via gears or pulleys, such that the pair of balance shafts 108 may be operated as a single unit.

A phase angle of the engine crankshaft may be defined as the angle between a vertical direction, and a crank throw of the crankshaft. A phase angle of each of the balance shafts 108 may be defined as the angle between the vertical direction and a centre of mass of an eccentric mass provided on the balance shaft. When the balance shafts are being rotated in order to balance vibrations of the engine assembly, it may be desirable for differences in phase angle of the crankshaft and the balance shafts to be maintained at predetermine values, e.g. such that each time the phase angle of the crankshaft is equal to 0 degrees the phase angles of the balance shafts 108 are equal to the predetermined values. When the balance shafts 108 are being rotated at the same speed as the crankshaft, the difference, e.g. the same difference, in phase angle between the crankshaft and the balance shaft 108 may be maintained throughout rotation of the balance shaft.

The hybrid engine assembly 100 may further comprise a controller 110 having one or more modules configured to control the operation of the engine 101, the electric motor 102 and/or the drive mechanism 104, e.g. the variable speed transmissions 105a, 105b. The controller 110 may control the electric motor 102 and/or the variable speed transmission 105a such that the direction and/or speed of rotation the balance shaft(s) 108 is controlled as desired in order to balance vibrations of the engine 101. Additionally, the controller 110 may be configured to control the electric motor 102, the variable speed transmission 105a and/or the further variable speed transmission 105b (if provided) in order to maintain the predetermined difference in phase angle between the crankshaft and the balance shaft(s).

The engine 101 may be a variable displacement engine. The engine may be configured to selectively deactivate one or more cylinders of the engine during operation of the engine, for example, when the engine is operating to provide a low power output, e.g. below a threshold value. By reducing the number of active cylinders in the engine, the efficiency of the engine may be increased, e.g. by reducing the pumping losses of the engine.

When the displacement of the engine is varied, the vibration characteristic of the engine may also change. Hence, it may be desirable for the speed and/or direction of rotation of one or more of the balance shafts and/or the phase angle of one or more of the balance shafts relative to the crankshaft to be adjusted. The controller 110 may be configured to determine a current operating mode of the engine 101, e.g. a current displacement or number and arrangement of active cylinders within the engine, and may control the operation of the electric motor 102 and/or the variable speed transmissions 108 in order to control the speed and/or direction of rotation of the balance shafts and/or a phase angle of the balance shafts relative to the engine crank shaft accordingly.

In some arrangements of the present disclosure, the engine 101 may comprise a four-cylinder engine. When the engine is operating with each of the cylinders active, a vibration characteristic of the engine 101 may be balanced by rotating the balance shafts 108 at twice the rotational speed of the crankshaft and with the balance shafts 108 rotating in opposite directions to one another. When the torque being delivered by the engine 101 and/or the running speed of the engine 101 is below a predetermined threshold value, the engine 101 may be controlled to deactivate one or more cylinders of the engine 101. Following deactivation of the cylinders, the vibration characteristic of the engine 101 may be changed. In order to continue balancing vibrations of the engine, the direction of rotation of one or more of the balance shafts 108 may be reversed. Additionally or alternatively, the rotational speed of the balance shafts 108 relative to crankshaft may be changed.

When the running speed of the engine 101 is high, e.g. above a further predetermined threshold value, it may not be desirable for vibrations of the engine 101 caused by imbalanced forces acting on the crankshaft to be balanced. For example, such vibrations may be less significant than other vibrations of the engine or vehicle and it may be desirable not to use power from the engine 101 or electric motor 102 to rotate the balance shafts 108, in order to improve the efficiency of the hybrid engine assembly 100. Hence, when the engine running speed is above a threshold value, the balance shafts 108 may not be rotated. For example, the electric motor 102 may be deactivated and/or the second and fourth couplings, e.g. between the electric motor 102 and the balance shafts 108 may be decoupled.

With reference to FIG. 4, the controller 110 may control the operation of the hybrid vehicle assembly 100 using a method 400, according to an arrangement of the present disclosure. Instructions for carrying out method 400 and the rest of the methods included herein may be executed by a controller based on instructions stored on a memory of the controller and in conjunction with signals received from sensors of the engine system, such as the sensors described above with reference to FIGS. 2 and 3. The controller may employ engine actuators of the engine system to adjust engine operation, according to the methods described below.

The method 400 begins at step 402 when operation of the hybrid vehicle begins. In a first determination step 404a, the controller determines whether it is desirable for the electric motor 102 to provide power to the engine 101 or transmission 150 of the vehicle, e.g. in order to start the engine 101 or provide supplementary power to the engine 101 or transmission 150. Alternatively, it may be determined in the first determination step 404a that it is desirable for the engine to receive power from the engine 101 or transmission 150 and to act as a generator to change the battery 103 of the vehicle.

The controller 110 then proceeds to a hybrid drive control step 406a, in which the hybrid engine assembly 100, e.g. the electric motor 102 and/or drive mechanism 104 are controlled appropriately according to the determination made in the first determination step 404a. After the hybrid engine assembly is controlled, the method returns to the first determination step 404a.

The method 400 further comprises a second determination step 404b, in which the controller determines whether it is desirable for the balance shafts 108 to be rotated in order to balance a vibration characteristic of the engine 101. The controller 110 then proceeds to an engine balancing step 406b, in which the hybrid engine assembly 100 is controlled in order to balance a vibration characteristic of the engine 101. For example, in the engine balancing step 406b the electric motor 102 may be operated to rotate the balance shaft 108 in order to balance vibrations of the engine. Alternatively, for example if the electric motor 102 is being controlled in order to provide power to the transmission 150, the variable speed transmission 105a may be controlled in order to rotate the balance shaft 108 appropriately, e.g. at an appropriate speed relative to the crank shaft and/or in an appropriate direction.

After performing the engine balancing step 406b, the method may return to the second determination step 404b. The controller 110 may continue performing the first and second determination steps 404a, 404b, and the hybrid drive control step 406a and engine balancing step 406b substantially simultaneously during operation of the hybrid vehicle 50.

Turning now to FIG. 5, it shows a method 500 for operating one or more balance shafts in response to one or more an engine speed.

The method 500 begins at 502, where the method 500 may include determining, estimating, and/or measuring current engine operating parameters. Current engine operating parameters may include, but are not limited to, one or more of throttle position, engine temperature, engine load, engine speed, manifold pressure, vehicle speed, exhaust gas recirculation flow rate, and air/fuel ratio.

At 504, the method 500 may include determining if the engine speed is greater than a threshold speed. The threshold speed may be equal to an engine speed corresponding to a relatively high engine load. Additionally or alternatively, the method may include determining if the engine load is greater than a threshold load. At any rate, if the engine speed is greater than the threshold speed or if the engine load is greater than the threshold load, then the method may proceed to 506 to decouple one or more balance shafts.

In one example, the decoupling may include decoupling the one or more balance shafts from an electric motor. In this way, operation of the electric motor during the engine condition where the engine speed is greater than the threshold speed may allow the electric motor to supply a majority, if not all, of its power to increase engine power output. Said another way, energy from the electric motor may not be transferred to one or more of the balance shaft when the engine speed is greater than the threshold speed.

Additionally or alternatively, the one or more balance shafts may be decoupled from the electric motor if a battery (e.g., battery 103 of FIGS. 2 and 3) is being charged. In this way, a state of charge of the battery may be replenished and its power is not drained to allow the electric motor to actuate the one or more balance shafts. As a result, when the battery is being charged and/or if the battery state of charge is less than a threshold state of charge (e.g., less than 10%), then the one or more balance shafts may be decoupled from the electric motor and only the engine may rotate the one or more balance shafts, if desired.

Returning to 504, if the engine speed is less than the threshold speed, then the method 500 may proceed to 508 to calculate a desired speed of one or more of the balance shafts. In the example of FIG. 2, there is only one balance shaft, and as a result, if the method of FIG. 5 is implemented with the example of FIG. 2, then only one desired balance shaft speed may be calculated. Conversely, if the method of FIG. 5 is implemented with the embodiment of FIG. 3, where there are at least two balance shafts, then one or more desired balance shaft speeds may be calculated. In some examples, a combination of speeds for first and second balance shafts may be calculated. In one example, the desired speeds of the first and second balance shafts may be unequal such that the first balance shaft is actuated (e.g., rotated) faster than the second balance shaft. This difference may result in increased muting of engine NVH. The calculation may be based on one or more current engine operating parameters including engine speed, vehicle speed, road conditions, and the like.

The method 500 may proceed to 510, where the method 500 may include powering the one or more balance shafts via an electric motor. In the example of the method 500 being implemented with the embodiment of FIG. 3, each of the balance shafts may be actuated via a single electric motor. In some examples, additionally or alternatively, each balance shaft may comprise its own electric motor. Furthermore, if the method 500 determines that it may be optimal to power only one of the two balance shafts, then the method may further include decoupling the first balance shaft from the electric motor and powering the second balance shaft via the electric motor.

Turning now to FIG. 6, it shows a method 600 for operating one or more balance shafts in response to one or more cylinders being deactivated. In one example, a cylinder deactivation may include not fuelling the cylinder. Additionally or alternatively, air may continue to flow therethrough, and as a result, intake and exhaust valves may continue opening and closing are corresponding times during the combustion cycle. However, the cylinder deactivation may also include closing the intake and exhaust valves such that air does not flow through the deactivated cylinder.

The method 600 begins at 602, where the method 600 may include determining, estimating, and/or measuring current engine operating parameters. Current engine operating parameters may include, but are not limited to, one or more of throttle position, engine temperature, engine load, engine speed, manifold pressure, vehicle speed, exhaust gas recirculation flow rate, and air/fuel ratio.

The method 600 may proceed to 604, where the method 600 may include determining if cylinder deactivation conditions are met. Cylinder deactivation conditions may be met if one or more of an engine speed is less than a threshold deactivation speed, a vehicle is braking, vehicle is stopped, and the like. If cylinder deactivation conditions are not met, then the method 600 may proceed to 606 to maintain current engine operating parameters and does not deactivate cylinders. As such, each of the cylinders of the engine may continue to receive one or more fuel injections. Additionally or alternatively, the balance shaft(s) may be operated via the method of FIG. 5 when the deactivation conditions are not met.

If the cylinder deactivation conditions are met, then the method 600 may proceed to 608 to deactivate one or more cylinders. As described above, this may include disabling fuel injections to each of the deactivated cylinders such that combustion may no longer occur. Air may or may not flow through the deactivated cylinder(s).

The method 600 may proceed to 610, where the method 600 may include calculating the desired balance shaft(s) speed. The calculation may further include if air is or is not flowing through the deactivated cylinders. Furthermore, a value of the calculation may increase in response to a number of deactivated cylinders increasing. For example, NVH associated with two cylinders being deactivated may be higher than the NVH associated with one cylinder being deactivated. Furthermore, the calculations may be determined based on feedback from a crankshaft position sensor.

The method 600 may proceed to 612, where the method 600 may include powering one or more balance shaft(s) via an electric motor. An amount of power delivered to the one or more balance shafts may be different. For example, a first balance shaft may receive a first amount of power and a second balance shaft may receive a second amount of power, where the first amount of power is greater than the second amount of power. The second amount of power may be zero in some example. Additionally or alternatively, the first and second amounts of power may be substantially equal (e.g., 50/50). By operating both or only one balance shaft via the electric motor, the cylinder deactivation may extend into lower engine speeds close to an engine idle while still muting NVH, as shown in plot 700 of FIG. 7.

Turning now to FIG. 7, it shows a plot 700 illustrating an engine speed operating range of an engine configured to deactivate one or more of its cylinders (e.g., a variable displacement engine (VDE)). Area 702 of the plot 700 may illustrate an engine speed range of previous examples of VDE engine comprising a balance shaft. As shown, the area 702 does not extend to an idle engine speed, where a greatest amount of fuel economy may be achieved. In one example, the previous examples may not extend to an idle engine speed due to lower engine order occurring during cylinder deactivation. Specifically, unpredictable excitations, both in frequency and amplitude, may occur throughout an operating range of the deactivation. As an example, in a three cylinder engine, the balance shaft may be configured to rotate at a substantially similar speed as a crankshaft and in a similar direction. Once a cylinder has been deactivated, such that only two cylinders out of the three are combusting, a 0.5 engine order is created. This may excite the powertrain and body modes at low engine RPMs (e.g., at or near idle) which may result in undesired vibrations for vehicle occupants. Thus, this range (e.g., area 704) may be avoided for balance shafts which are unable to move independently of the engine.

The balance shafts 108 of FIG. 3 or balance shaft 108 of FIG. 2 may allow the cylinder deactivation operation to extend into both areas 702 and 704. This may be due to the fact that the balance shafts may be moved independently of the engine via an electric motor (e.g., electric motor 102). As such, the cylinder deactivation may extend from area 702 to 704 when the balance shaft is coupled to the electric motor. In this way, the fuel economy benefits of operating a deactivated cylinder at low engine speeds at or near idle may be achieved without generating undesired vibrations.

Although the present disclosure has been described with reference to a hybrid vehicle comprising a hybrid engine assembly, it is also envisaged that the present disclosure may apply to a conventional engine assembly. In other words, the electric motor may be a starter motor or otherwise may not be operatively coupled to the engine 101 or the transmission 150. In this way, one or more balance shafts may be operatively coupled to an electric motor.

This may allow the one or more balance shafts to be actuated independently of the engine. The technical effect of independently operating the one or more balance shafts is to allow a cylinder deactivation operation to extend into an engine speed range at or close to idle. This may allow the engine to realize increased fuel economy benefits.

An internal combustion engine assembly for a motor vehicle comprising an engine, an electric motor, wherein the motor vehicle is a hybrid vehicle and wherein the electric motor forms part of a hybrid drive system of the vehicle, and a balance shaft comprising an eccentric mass, wherein the electric motor is configured to selectively rotate the balance shaft to balance a vibration characteristic of the engine.

A first example of the engine assembly further includes where the electric motor is configured to selectively provide power to a crankshaft or transmission of the motor vehicle. A second example of the engine assembly, optionally including the first example, further includes where the engine is a variable displacement engine, wherein the vibration characteristic of the engine varies according to the displacement of the engine. A third example of the engine assembly, optionally including the first and/or second examples, further includes where the engine assembly is configured to control a rotation of the balance shaft according to the displacement of the engine.

A fourth example of the engine assembly, optionally including one or more of the first through third examples, further includes where the rotational speed and direction of the electric motor is variable such that the speed and direction of rotation of the balance shaft is varied. A fifth example of the engine assembly, optionally including one or more of the first through fourth examples, further includes where the engine assembly further comprises a variable speed transmission operatively disposed between the electric motor and the balance shaft, the variable speed transmission being configured such that a speed and direction of rotation of the balance shaft is varied. A sixth example of the engine assembly, optionally including one or more of the first through fifth examples, further includes where the speed and direction in which the balance shaft is rotated is varied according to the displacement of the engine. A seventh example of the engine assembly, optionally including one or more of the first through sixth examples, further includes where the rotational speed and direction of the balance shaft is varied according to the number of cylinders of the engine that are active. An eighth example of the engine assembly, optionally including one or more of the first through seventh examples, further includes where the rotation of the balance shaft is controlled to maintain a predetermined difference in phase angle between the balance shaft and a crankshaft of the engine. A ninth example of the engine assembly, optionally including one or more of the first through eighth examples, further includes where the assembly further comprises a controller comprising one or more modules configured to control the operation of the engine and the electric motor. A tenth example of the engine assembly, optionally including one or more of the first through ninth examples, further includes where the controller further comprises one or more modules configured to control the operation of the variable speed transmission. An eleventh example of the engine assembly, optionally including one or more of the first through tenth examples, further includes where the assembly further comprises a further balance shaft comprising a further eccentric mass, wherein the electric motor is configured to selectively rotate the further balance shaft relative to the engine to balance the vibration characteristic of the engine. A twelfth example of the engine assembly, optionally including one or more of the first through eleventh examples, further includes where the engine assembly further comprises a further variable speed transmission operatively disposed between the electric motor and the further balance shaft, the further variable speed transmission being configured such that the speed and direction of rotation of the further balance shaft may be varied. A thirteenth example of the engine assembly, optionally including one or more of the first through twelfth examples, further includes where the variable speed transmission and the further variable speed transmission are configured to maintain a predetermined difference in phase angle between the balance shaft and the further balance shaft. A fourteenth example of the engine assembly, optionally including one or more of the first through thirteenth examples, further includes where the assembly is configured to maintain a predetermined difference in phase angle between the balance shaft and the further balance shaft.

A method of operating an internal combustion engine assembly for a motor vehicle, wherein the engine assembly comprises an engine, an electric motor wherein the motor vehicle is a hybrid vehicle and wherein the electric motor forms part of a hybrid drive system of the vehicle, and a balance shaft comprising an eccentric mass, wherein the method comprises rotating the balance shaft using the electric motor to balance a vibration characteristic of the engine. A first example of the method further includes where the electric motor is a motor-generator provided within the hybrid drive system of the vehicle, and wherein the method further comprises receiving power from the engine or a brake system of the vehicle using the electric motor, charging a battery of the hybrid vehicle using the electric motor, and driving the rotation of the balance shaft using the engine while the battery is being charged. A second example of the method, optionally including the first example, further includes where the engine comprises a variable displacement engine, wherein the method further comprises varying the displacement of the engine, and controlling the speed and direction of rotation of the balance shaft to balance the vibration characteristic of the engine. A third example of the method optionally including the first and/or second examples, further includes where decoupling the electric motor from the balance shaft when the engine running speed is above a threshold running speed.

A hybrid engine system comprising a variable displacement engine comprising at least one cylinder that is deactivatable an electric motor, a first balance shaft and a second balance shaft selectively coupled to the electric motor, and a controller with computer-readable instructions stored thereon that when executed enable the controller to rotate the first and second balance shafts in response to the engine speed being less than a threshold speed or at least one cylinder being deactivated, decouple the first and second balance shafts from the electric motor in response to one or more of the engine speed being greater than or equal to the threshold speed and a battery being charged.

It will be appreciated by those skilled in the art that although the disclosure has been described by way of example, with reference to one or more exemplary examples, it is not limited to the disclosed examples and that alternative examples could be constructed without departing from the scope of the disclosure as defined by the appended claims.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An internal combustion engine assembly for a motor vehicle comprising:
   an engine;
   an electric motor, wherein the motor vehicle is a hybrid vehicle and wherein the electric motor forms part of a hybrid drive system of the vehicle; and
   a balance shaft comprising an eccentric mass, wherein the electric motor is configured to selectively rotate the balance shaft to balance a vibration characteristic of the engine.

2. The engine assembly of claim 1, wherein the electric motor is configured to selectively provide power to a crankshaft or transmission of the motor vehicle.

3. The engine assembly of claim 1, wherein the engine is a variable displacement engine, wherein the vibration characteristic of the engine varies according to the displacement of the engine.

4. The engine assembly of claim 3, wherein the engine assembly is configured to control a rotation of the balance shaft according to the displacement of the engine.

5. The engine assembly of claim 4, wherein a rotational speed and direction of the electric motor is variable such that the rotational speed and direction of the balance shaft is varied.

6. The engine assembly of claim 1, wherein the engine assembly further comprises a variable speed transmission operatively disposed between the electric motor and the balance shaft, the variable speed transmission being configured such that a speed and direction of rotation of the balance shaft is varied.

7. The engine assembly of claim 6, wherein the speed and direction in which the balance shaft is rotated is varied according to the displacement of the engine.

8. The engine assembly of claim 6, wherein the rotational speed and direction of the balance shaft is varied according to the number of cylinders of the engine that are active.

9. The engine assembly of claim 6, wherein the rotation of the balance shaft is controlled to maintain a predetermined difference in phase angle between the balance shaft and a crankshaft of the engine.

10. The engine assembly of claim 6, wherein the assembly further comprises a controller comprising one or more modules configured to control the operation of the engine and the electric motor.

11. The engine assembly of claim 10, wherein the controller further comprises one or more modules configured to control the operation of the variable speed transmission.

12. The engine assembly of claim 6, wherein the assembly further comprises:
    a further balance shaft comprising a further eccentric mass, wherein the electric motor is configured to selectively rotate the further balance shaft relative to the engine to balance the vibration characteristic of the engine.

13. The engine assembly of claim 12, wherein the engine assembly further comprises a further variable speed transmission operatively disposed between the electric motor and the further balance shaft, the further variable speed transmission being configured such that the speed and direction of rotation of the further balance shaft may be varied.

14. The engine assembly of claim 13, wherein the variable speed transmission and the further variable speed transmission are configured to maintain a predetermined difference in phase angle between the balance shaft and the further balance shaft.

15. The engine assembly according to claim 13, wherein the assembly is configured to maintain a predetermined difference in phase angle between the balance shaft and the further balance shaft.

16. A method of operating an internal combustion engine assembly for a motor vehicle, wherein the engine assembly comprises:
    an engine;
    an electric motor wherein the motor vehicle is a hybrid vehicle and wherein the electric motor forms part of a hybrid drive system of the vehicle; and
    a balance shaft comprising an eccentric mass, wherein the method comprises:
    rotating the balance shaft using the electric motor to balance a vibration characteristic of the engine.

17. The method of claim 16, wherein the electric motor is a motor-generator provided within the hybrid drive system of the vehicle, and wherein the method further comprises:
    receiving power from the engine or a brake system of the vehicle using the electric motor;
    charging a battery of the hybrid vehicle using the electric motor; and
    driving the rotation of the balance shaft using the engine while the battery is being charged.

18. The method of any of claim 16, wherein the engine comprises a variable displacement engine, wherein the method further comprises:
    varying the displacement of the engine; and
    controlling the speed and direction of rotation of the balance shaft to balance the vibration characteristic of the engine.

19. The method of any of claim 18, wherein the method comprises:
    decoupling the electric motor from the balance shaft when the engine running speed is above a threshold running speed.

20. A hybrid engine system comprising:
    a variable displacement engine comprising at least one cylinder that is deactivatable;
    an electric motor;
    a first balance shaft and a second balance shaft selectively coupled to the electric motor; and
    a controller with computer-readable instructions stored thereon that when executed enable the controller to:
    rotate the first and second balance shafts in response to the engine speed being less than a threshold speed or at least one cylinder being deactivated;
    decouple the first and second balance shafts from the electric motor in response to one or more of the engine speed being greater than or equal to the threshold speed and a battery being charged.

* * * * *